United States Patent [19]

McRae

[11] 4,151,491
[45] Apr. 24, 1979

[54] TECHNIQUE FOR SUPPLYING REFERENCE FOR AN ADAPTIVE EQUALIZER WHEN MULTIPLE PHASE SIGNALS ARE TRANSMITTED

[75] Inventor: Daniel D. McRae, West Melbourne, Fla.

[73] Assignee: Harris Corporation, Cleveland, Ohio

[21] Appl. No.: 837,355

[22] Filed: Sep. 28, 1977

[51] Int. Cl.$^2$ .......................... H04B 3/04; H03H 7/16
[52] U.S. Cl. .......................................... 333/18; 325/42
[58] Field of Search ..................... 333/18; 325/42, 323, 325/473; 364/574, 581, 724

[56] References Cited

U.S. PATENT DOCUMENTS

| | | | |
|---|---|---|---|
| 3,978,407 | 8/1976 | Forney, Jr. et al. | 333/18 X |
| 4,004,226 | 1/1977 | Qureshi et al. | 333/18 X |
| 4,035,625 | 7/1977 | Chiu et al. | 333/18 X |

Primary Examiner—Paul L. Gensler
Attorney, Agent, or Firm—Craig & Antonelli

[57] ABSTRACT

The adverse effects of node slips on the operation of an adaptive equalizer are corrected by determining phase and amplitude errors in the received vector signal relative to phase and amplitude estimates, based on node decisions. The phase and amplitude error signals are aligned in a prescribed fashion with the tip of the received signal vector and, from this alignment, respective X and Y components of the error signals are obtained and fed back to the equalizer as projected X and projected Y errors for updating the equalizer weights.

10 Claims, 4 Drawing Figures

TECHNIQUE FOR SUPPLYING REFERENCE FOR AN ADAPTIVE EQUALIZER WHEN MULTIPLE PHASE SIGNALS ARE TRANSMITTED

FIELD OF THE INVENTION

The present invention relates to communication systems and is particularly directed to a technique of deriving and supplying error correction signals to an adaptive equalizer employed in receiver detection circuitry handling multiple phase transmission signals.

BACKGROUND OF THE INVENTION

Where high bit rate data signals are transmitted through band-limited channels, it is common practice to employ an adaptive transversal equalizer to combat cross-talk introduced by the band limiting process. A conventional technique of the controlling operation of an equalizer wherein a reference signal is used involves the training of weights by which received signals are modified. Many communication systems employing adaptive equalizers require a period of time devoted to this training of the equalizer weights, during which period no data is transmitted, but rather a perfect replica of a prescribed transmitted signal is regenerated at the receiver as a reference for the equalizer.

It is often desirable to continue to adjust or update the weight values of the equalizer after the training mode has been completed and data is being transmitted and received. A common approach to handling this problem is to use the decided data values as reference signals for the equalizer. A schematic diagram of an equalizer arrangement wherein this technique is employed is shown in FIG. 1.

In accordance with this approach, multiple phase input signals, for example QAM signals, are supplied to an adaptive equalizer 10, from which phase quadrature X and Y components of a received signal vector are derived. These X and Y components are then analyzed in appropriate decision logic circuit 11, from which there are obtained estimates $R_{EST}$ and $P_{EST}$ of the magnitude and phase of the received signal vector, respectively. From these estimates, a pair of error signals $\Delta X$ and $\Delta Y$, determined by the degree of amplitude and phase error, relative to decided transmitted signal node values, are generated and fed back to equalizer 10 to update the weight values of the equalizer.

If the error rate is low, this approach provides a nearly perfect reference for the equalizer. However, a severe problem arises in multiple phase signal systems wherein phase node slips may occur. While such slips can be taken into account in data derivation by differential encoding of the data, they insert inadmissable errors in the reference signals for the adaptive equalizer.

SUMMARY OF THE INVENTION

In accordance with the present invention, the adverse effects of node slips on the operation of the adaptive equalizer are corrected by departing from the usual approach for supplying references for the adaptive equalizer. Specifically, rather than supply the derived X and Y errors from the received vector decision circuit to update the equalizer weights, the phase and amplitude error signals are aligned in a prescribed fashion with the tip of the received signal vector and from this alignment, respective X and Y components of the error signals are obtained and fed back to the equalizer as projected X and projected Y errors for updating the equalizer weights.

DETAILED DESCRIPTION

Figure 2:
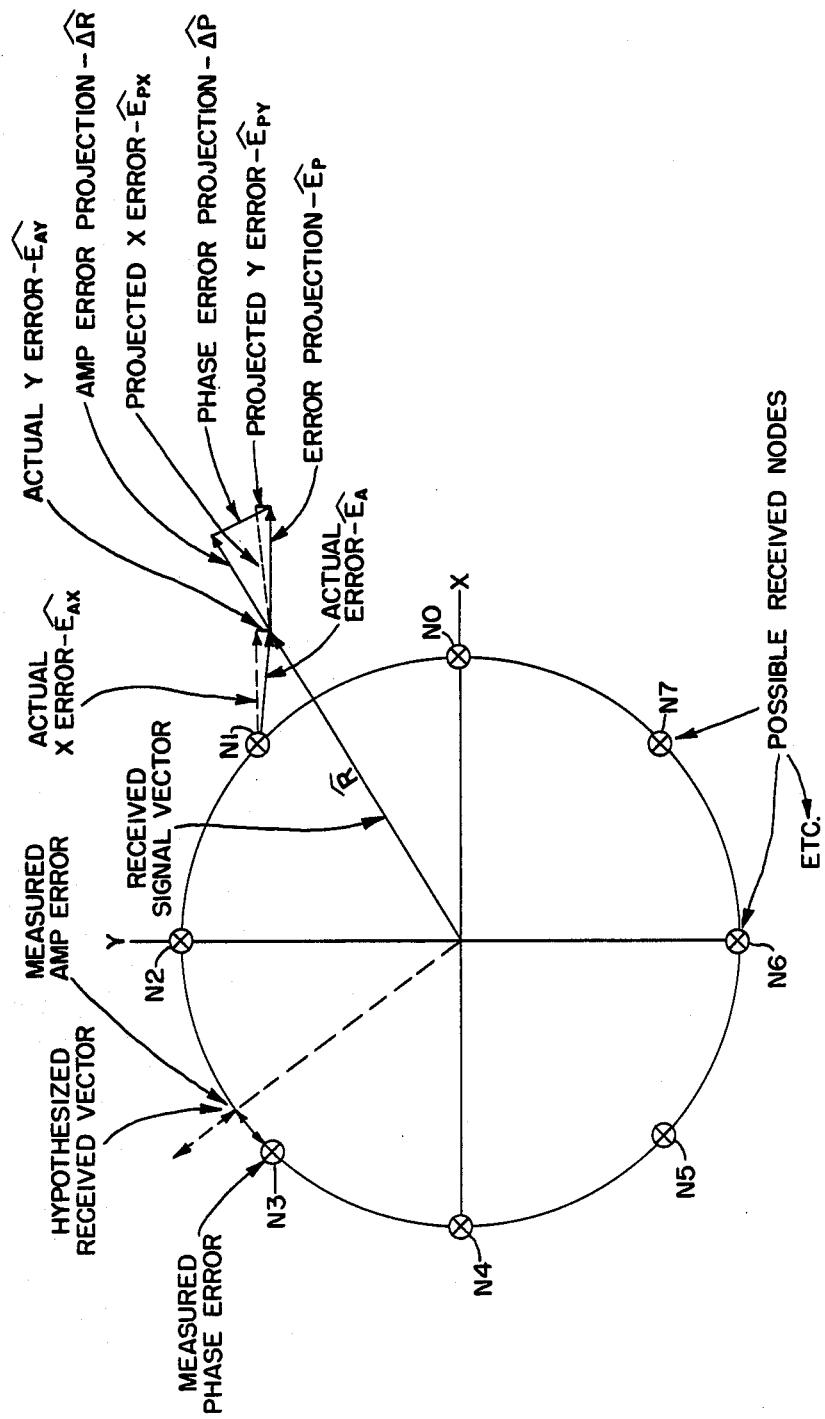
FIG. 2 is an exemplary vector diagram of a received signal vector and attendant phase error components.

FIG. 2 illustrates, by way of a vector diagram, the effect of the problem which the present invention seeks to combat and the particular solution provided. For purpose of illustration, a single amplitude, eight phase transmission signal is assumed with the eight possible transmitted phase nodes lying at the node positions N0-N7, as shown. An arbitrary received QAM signal is designated by the received signal vector $\hat{R}$. Now, if the node closest to vector $\hat{R}$, node N1, were the actual transmitted phase, there would be an error designated by actual error vector $\hat{E}_A$ having respective components $\hat{E}_{AX}$ and $\hat{E}_{AY}$. However, if the phase tracking algorithm or loop has slipped two nodes counter-clockwise, identifying node N3 as the transmitted node for example, very erroneous X and Y modifiers for the adaptive equalizer will be derived, even through the node slipping is of no consequence to data decisions if differential phase coding is used in the transmission system to represent information.

Now, from the signal tracking algorithm (which is correct except for the node slip), there are obtained respective phase and amplitude estimates or decisions from which phase and amplitude errors are derived. In accordance with the present invention, these derived phase and amplitude errors are projected at the tip of the received signal vector in the manner shown in FIG. 2, wherein there are illustrated an amplitude error projection vector $\Delta \hat{R}$ and a phase error projection vector $\Delta \hat{P}$. The amplitude error vector $\Delta \hat{R}$ is projected to be aligned with the direction of received signal vector $\hat{R}$, while the phase error vector $\Delta \hat{P}$ is aligned in a direction orthognal to the direction of the aligned amplitude error vector $\Delta \hat{R}$, to result in an error projection vector $\hat{E}p$. The resultant vector $\hat{E}p$ may be separated into its cartesian coordinate components $\hat{E}px$ and $\hat{E}py$, which components are employed to update the weights of the adaptive equalizer.

Figure 1:
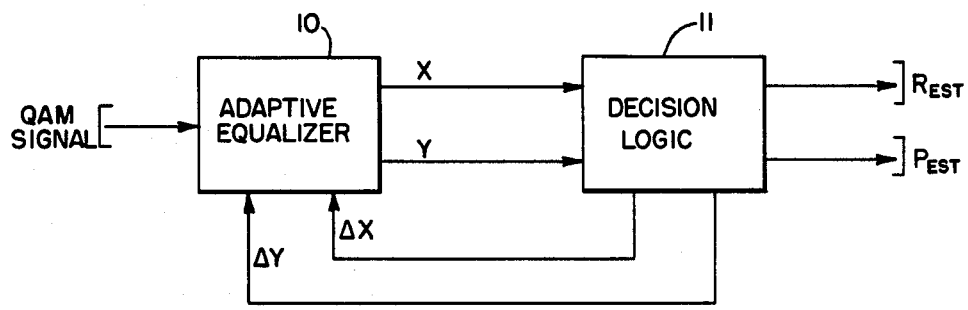
FIG. 1 is a schematic block diagram of a conventional scheme for updating the operational characteristics of an adaptive equalizer.
Figure 3:
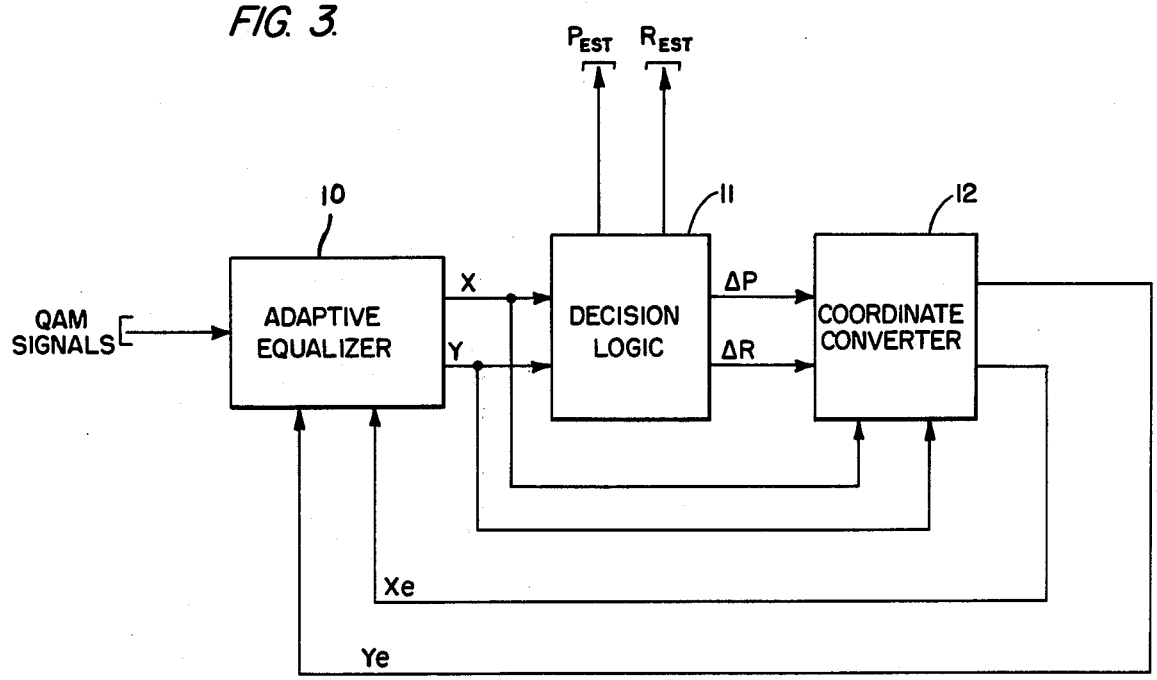
FIG. 3 is a schematic block diagram of a scheme for updating the signal processing weights of adaptive equalizer in accordance with the present invention.

A circuit implementation of the above scheme is shown in block diagram form in FIG. 3, wherein respective X and Y components of the received signal vector are derived at the output of the equalizer 10 and supplied to decision logic circuit 11 just as in the conventional circuit configuration shown in FIG. 1. Decision logic circuit 11 carries out a transmitted amplitude and phase decision process to obtain estimates of the transmitted amplitude and phase, $R_{EST}$ and $P_{EST}$, respectively, from which there are also derived amplitude and phase errors $\Delta R$ and $\Delta P$, respectively. However, unlike the conventional approach to updating the equalizer weights, described previously, in accordance with the present invention, the amplitude and phase error signals ΔR and ΔP are supplied to a coordinate converter 12 which effectively aligns the components ΔR and ΔP in a prescribed relationship with the received signal vector, as described above in connection with FIG. 2, and supplies the quadrature components $\hat{E}px$ and $\hat{E}py$, of the resultant projected error vector $\hat{E}p$, to the adaptive equalizer as respective error signals Xe and Ye. To provide a proper reference with which the amplitude and phase error vectors are to be aligned, the X and Y outputs of the equalizer 10 are also coupled to converter 12.

Figure 4:
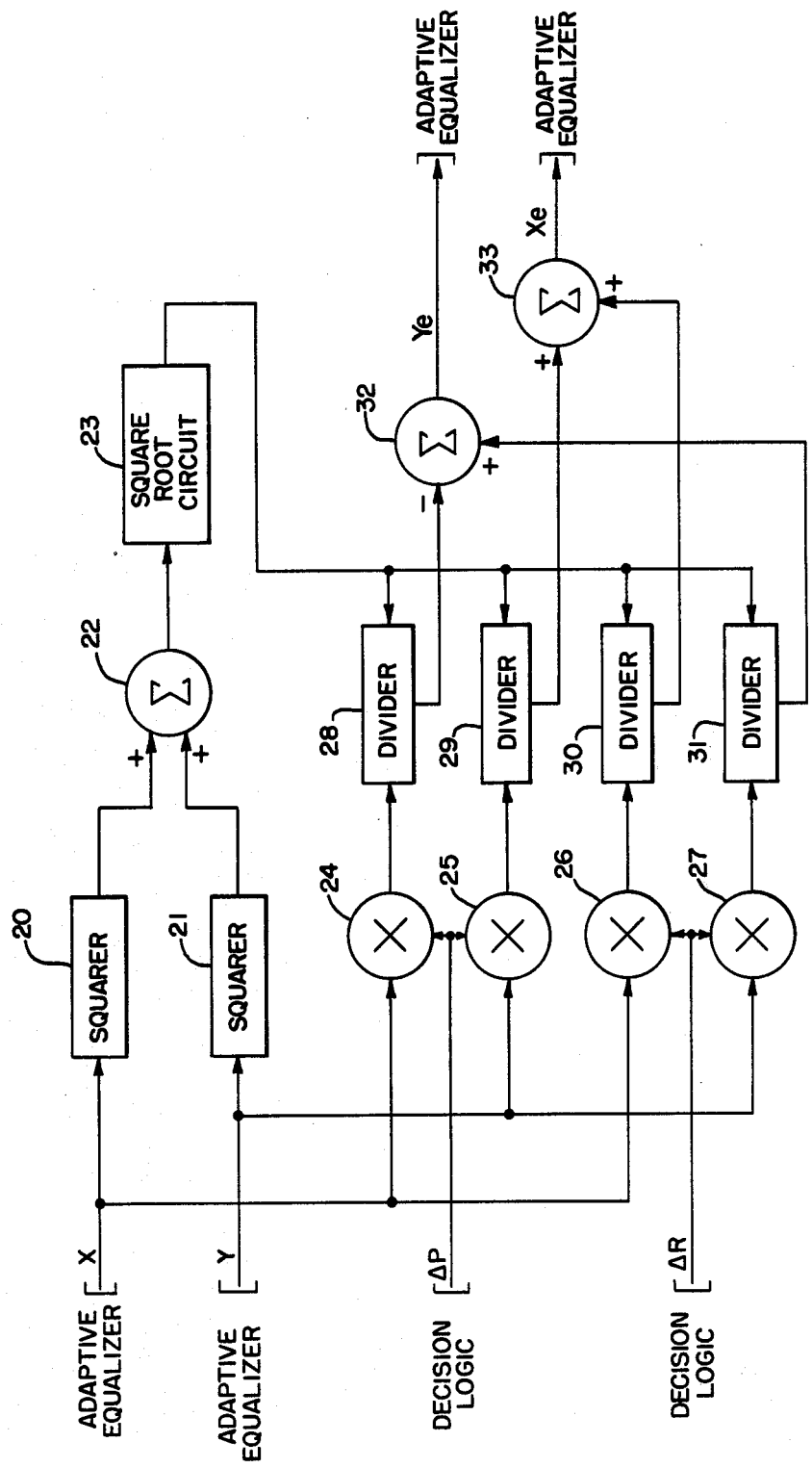
FIG. 4 is a detailed illustration of a coordinate-converter circuit which may be used in the equalizer weight mofidication scheme shown in FIG. 3.

FIG. 4 shows an exemplary implementation which the coordinate converter may take in order to derive the equalizer modifier components Xe and Ye. Reducing the vector components for projected phase and amplitude error components as shown in FIG. 2 yields the following relationships which are effected by the coordinate converter configuration of FIG. 4:

$$X_e = (X \cdot \Delta R/R) + (Y \cdot \Delta P/R)$$

and $$Y_e = Y \cdot \Delta R/R - X \cdot \Delta P/R$$

To carry out these calculations, the cartesian coordinate components X and Y making up received signal vector $\hat{R}$ are supplied as a first set of input signals to respective squarer circuits 20 and 21 and pairs of multiplier circuits 24, 26, and 25, 27, respectively. Multipliers 24 and 25 also receive the phase error signal ΔP from decision logic 11, while multipliers 26 and 27 receive the amplitude error signal ΔR.

The outputs of squarer circuits are summed in a summation circuit 22 to obtain a signal $(X^2+Y^2)$ which is supplied to square root circuit 23, from which a signal representative of the magnitude R of the received signal vector is obtained. The outputs of each of multipliers 24–27 is supplied to a respective divider circuit 28–31 and is divided by the output of square root circuit 23 as a second input thereto. The outputs of divider circuits 29 and 30 are added together in summation circuit 33 while the output of divider 28 is subtracted from the output of divider 31 in circuit 32.

The output Xe of summation circuit 33 represents the projected X error $\hat{E}px$ while the output Ye of circuit 32 represents the projected Y error $\hat{E}py$. These signals are supplied to equalizer 10 to update its modifier weights.

The equalizer weight modifier values obtained in accordance with the above technique have been found to ensure reliable continued equalization of an adaptive equalizer for a multiple phase signal when the received phase node values are subject to slippage or variations, thereby affording the full advantages of differential phase transmission.

While I have shown and described one embodiment in accordance with the present invention, it is understood that the same is not limited thereto but is susceptible of numerous changes and modifications as known to a person skilled in the art, and I therefore do not wish to be limited to the details shown and described herein but intend to cover all such changes and mofidications as are obvious to one of ordinary skill in the art.

I claim:

1. In a communication system wherein received multiple phase modulated signals are processed through an adaptive equalizer and equalizer parameters are modified in accordance with the degree of determined error in the amplitude and phase of decided signal values, relative to received signal values, an improved technique for supplying equalizer parameter modifier signals and thereby continuously update the operation of the equalizer in accordance with the characteristics of the received data comprising the steps of:

aligning a first signal vector representative of the error in the amplitude of a received signal vector, relative to that of the estimated amplitude of its corresponding actually transmitted signal vector, in the direction of and at the tip of said received signal vector, aligning a second signal vector representative of the error in phase of said received signal vector, relative to that of the estimated phase of said corresponding actually transmitted signal vector, in a direction orthogonal to and at the tip of said aligned first signal vector, generating a pair of signals respectively representative of the orthogonal components of which the signal resulting from the vector sum of said first and second signal vectors is comprised, and supplying said pair of signals to said adaptive equalizer for modifying said equalizer parameters in accordance therewith.

2. The improvement according to claim 1, wherein said step of aligning said first signal vector comprises the steps of:

generating a signal representative of the amplitude of said received signal vector in response to a pair of quadrature signal components from said equalizer representative of the orthogonal signal components of which a received signal vector is comprised, and multiplying each of said quadrature signal components by a signal representative of the ratio of error in the amplitude of the received signal vector to the signal representative of the amplitude of said received signal vector.

3. The improvement according to claim 1, wherein said step of aligning said second signal vector comprises the steps of:

generating a signal representative of the amplitude of said received signal vector in response to a pair of quadrature signal components from said equalizer representative of the orthogonal signal components of which a received signal vector is comprised, and multiplying each of said quadrature components by a signal representative of the ratio of error in the phase of the received signal vector to the signal representative of the amplitude of said received signal vector.

4. The improvement according to claim 2, wherein said step of aligning said second signal vector comprises the step of multiplying each of said quadrature components by a signal representative of the ratio of error in the phase of the received signal vector to the signal representative of the amplitude of said received signal vector.

5. The improvement according to claim 4, wherein said step of generating said pair of signals comprises the steps of selectively combining the signals resulting from each of said multiplying steps in accordance with the respective orthogonal coordinates by which said quadrature signal components are defined.

6. In a communication system wherein received multiple phase modulated signals are processed through an adaptive equalizer and equalizer parameters are modified in accordance with the degree of estimated error in the amplitude and phase of decided signal values, relative to received signal values, an improved system for supplying equalizer parameter modifier signals to thereby dynamically adjust the operation of said equalizer in accordance with the characteristics of the received data comprising:

first means for aligning a first signal vector representative of the error in the amplitude of a received signal vector, relative to that of the estimated amplitude of its corresponding actually transmitted signal vector, in the direction of and at the tip of said received signal vector, second means for aligning a second signal vector representative of the error in phase of said received signal vector, relative to that of the estimated phase of said corresponding actually transmitted signal vector, in a direction orthogonal to and at the tip of said aligned first signal vector, and third means, coupled to said first and second means, for generating a pair of signals respectively representative of orthogonal components of which the signal resulting from the vector sum of said first and second signal vectors is comprised, and supplying said pair of signals to said adaptive equalizer for modifying said equalizer parameters in accordance therewith.

7. The improvement according to claim 6, wherein said first means comprises:

means for generating a signal representative of the amplitude of said received signal vector in response to a pair of quadrature signal components from said equalizer representative of the orthogonal signal components of which a received signal vector is comprised, and means for multiplying each of said quadrature signal components by a signal representative of the ratio of error in the amplitude of the received signal vector to the signal representative of the amplitude of said received signal vector.

8. The improvement according to claim 6, wherein said step of aligning said second signal vector comprises the steps of:

means for generating a signal representative of the amplitude of said received signal vector in response to a pair of quadrature signal components from said equalizer representative of the orthogonal signal components of which a received signal vector is comprised, and means for multiplying each of said quadrature components by a signal representative of the ratio of error in the phase of the received signal vector to the signal representative of the amplitude of said received signal vector.

9. The improvement according to claim 7, wherein said second means comprises means for aligning said second signal vector comprising the step of multiplying each of said quadrature components by a signal representative of the ratio of error in the phase of the received signal vector to the signal representative of the amplitude of said received signal vector.

10. The improvement according to claim 9, wherein said third means comprises means for selectively combining the outputs of each of said multiplying means in accordance with the respective orthogonal coordinates by which said quadrature signal components are defined.

* * * * *

UNITED STATES PATENT AND TRADEMARK OFFICE
CERTIFICATE OF CORRECTION

PATENT NO. : 4,151,491
DATED : April 24, 1979
INVENTOR(S) : Daniel Dix McRae

It is certified that error appears in the above-identified patent and that said Letters Patent are hereby corrected as shown below:

In the specification column 1 between lines 5 and 6 insert the following paragraph:

The United States Government has rights in this invention pursuant to Contract No. F 30602-75-C0129 awarded by the Department of the Air Force.

Signed and Sealed this

Twenty-eighth Day of August 1979

[SEAL]

Attest:

*Attesting Officer*

LUTRELLE F. PARKER
*Acting Commissioner of Patents and Trademarks*